Nov. 14, 1950 — E. J. WELLS — 2,530,318
CHUCK
Filed Sept. 17, 1949 — 2 Sheets-Sheet 1

INVENTOR.
Earl J. Wells
BY
Robert N. Poennoff
ATTORNEY

Nov. 14, 1950  E. J. WELLS  2,530,318
CHUCK
Filed Sept. 17, 1949  2 Sheets-Sheet 2
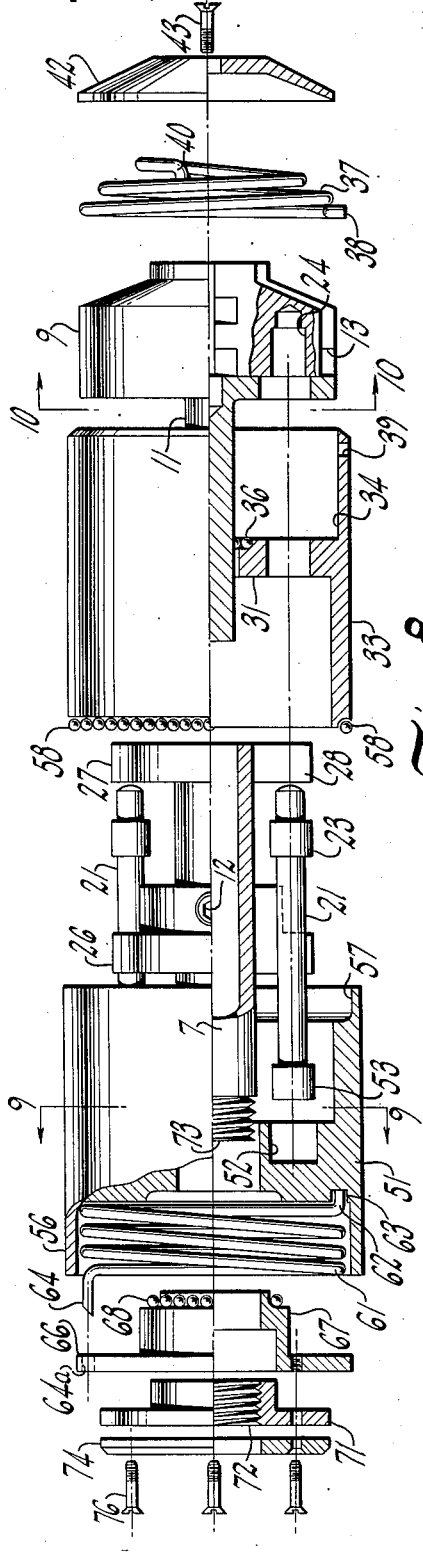
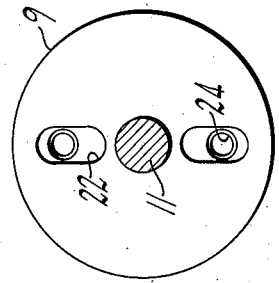
Fig. 10
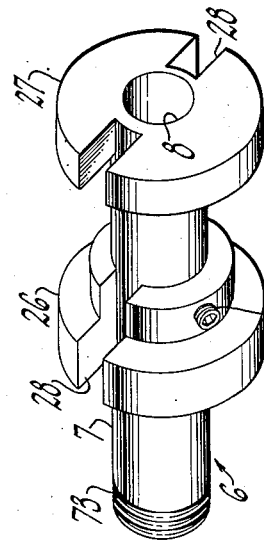
Fig. 11
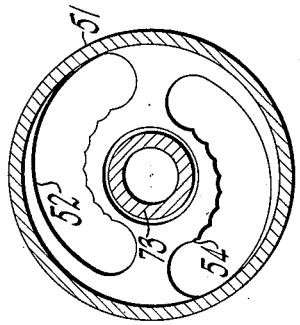
Fig. 9
INVENTOR.
Earl J. Wells
BY
ATTORNEY Patented Nov. 14, 1950

2,530,318

UNITED STATES PATENT OFFICE 2,530,318

CHUCK

Earl J. Wells, Comptche, Calif.

Application September 17, 1949, Serial No. 116,233

9 Claims. (Cl. 279—68)

This invention relates to an improvement in chucks and particularly to a chuck which, when mounted upon a spindle as in a lathe, drill press, can be opened and closed while the spindle is rotating at a normal speed to remove, insert and lock another tool or work piece in place in the chuck.

It is in general the broad object of the present invention to provide a chuck which can be operated while the chuck is rotated.

Another object of the present invention is to provide a novel chuck construction, one enabling the chuck to be manipulated merely by the relative rotation of cylindrical surfaces providing the chuck housing.

The invention includes other objects and features of advantage, some of which, together with the foregoing, will appear hereinafter wherein the present preferred form of chuck of this invention is disclosed.

In the drawings accompanying and forming a part hereof,

Figure 2:
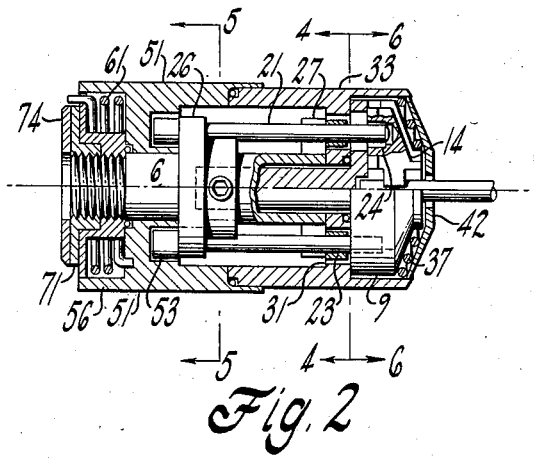
Figure 2 is a side elevation, partly in section.
Figure 3:
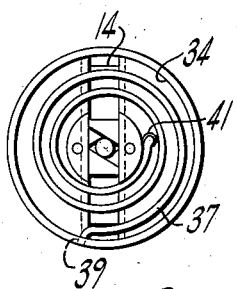
Figure 3 is a front view of the chuck with the front cover plate removed.
Figure 4:
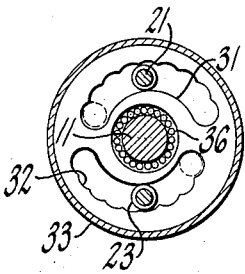
Figure 5:
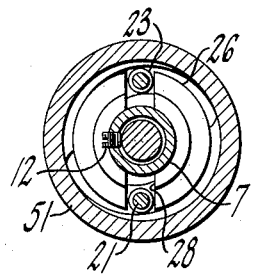
Figure 6:
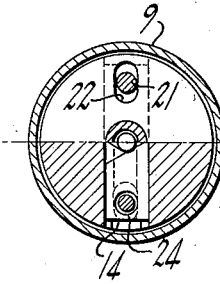

Figures 4, 5 and 6 are, respectively, sections taken along the lines 4—4, 5—5 and 6—6 in Figure 2.

Figure 7:
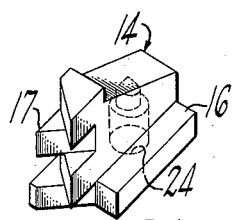

Figure 7 is a perspective view of a chuck jaw.

Figure 8 is a side elevation, partly in section, with various of the parts in an exploded relation to the other to illustrate the construction employed.

Figure 9 is a section taken along the line 9—9 in Figure 8.

Figure 10 is a section taken along the line 10—10 in Figure 8.

Figure 11 is a perspective view of a portion of the chuck.

Referring particularly to the drawings, the chuck includes a central hub indicated generally at 6 and made up of a tubular section 7 having a tapered recess 8 at one end thereof for mounting upon a correspondingly tapered shaft end. The hub includes a face plate 9 provided upon a rod 11, the latter fitting into the tubular hub 7 and being secured therein by a set screw 12 to complete the central hub 6.

The face plate includes T-shaped slots 13 extending radially of the plate and providing a slidable support for movable chuck jaws 14. As appears in Figure 7, each chuck jaw is of a form and size to fit slidably in a T slot and includes an outwardly extending flange portion 16 on the rear face of the jaw, each jaw fitting slidably in a T-shaped groove 13.

In the form of the chuck shown, two jaws are provided. Obviously, three jaws can be utilized, if desired, by increasing the number of parts, these being otherwise the same, but their size being diminished if the device is to be maintained of the same external diameter. In the case of the two-jaw chuck, to permit of accurate and immediate centering of round objects placed in the chuck, each jaw includes a plurality of cooperatively positioned but laterally spaced V-shaped segments 17. The jaws are symmetrical when positioned in a side-by-side relationship; thus, when the jaws are placed in a mating relationship in the chuck, the respective segments interlock and provide a passage defined by oppositely provided V-shaped members so that a circular object is readily centered.

Figure 1:
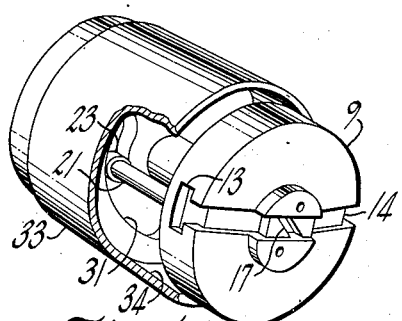
Figure 1 is a perspective view illustrating the chuck of the present invention, portions of the chuck broken away to illustrate the construction.

Means are provided for moving the jaws toward and away from one another, which means can be operated while the chuck is rotating. In the form of the chuck depicted, this includes a rod 21 extending through a slot 22 in the face plate 9 and into a recess 24 in a chuck jaw, there being a rod for each jaw. A bushing 23 is provided upon the rod, the bushing fitting in the cam track 32 as appears in Figure 1.

The several rods are parallel to the longitudinal axis of the central hub and, as presently described, are slidable toward and away from such hub to move the chuck jaws to admit a larger or a smaller object. To support the rods for such sliding movement, spaced flanges 26 and 27 are provided upon the central hub 6 (Figure 11), each flange including a radial slot 28 therein, the slots in each flange being aligned so that the rods are supported in a generally parallel relation to the axis of the hub and to one another.

Means are provided for moving the rods slidably in the slots 28 to vary the position of the chuck jaws. This means comprises a first cam plate 31, having a cam track 32 therein for each rod 21. As appears in Figure 9, each cam track 32 is of an arcuate form and extends spirally about the longitudinal axis of the chuck, that is the faces of the track are spaced outwardly and at a uniformly increasing distance from such axis as one moves along the track face. Thus, as the cam plate 31 is rotated, the rods 21 are moved toward or away from one another, and from the axis of chuck, depending upon the direction of rotation of the plate.

To provide a housing for the chuck, the cam plate 31 preferably includes an outer cylindrical housing 33 which provides a recess 34 for the face plate 9. Ball bearings 36 are provided in a suitable race between the cam plate 31 and the rear of the face plate.

Means are provided for moving the chuck jaws into a closed position. This means is preferably a spring, effective to rotate the chuck housing 33 and thus the cam plate 31 with respect to the face plate 9; thus, if the face plate be regarded as stationary and if one is viewing the device from the front of the chuck, then the spring tends to move the housing 33 counter-clockwise in Figure 6. To effect such movement, a coiled spring 37 is provided, having an end 38 engaged with an aperture 39 in the housing 33. The spring includes a projection 40 at its other end fitting into a recess 41 in the face plate. A cover plate 42 is secured in place on the face plate to retain the spring 37 in position, screws 43 being utilized for this purpose.

Means are provided for locking the jaws in a desired position of adjustment and particularly when the jaws are engaged with an object. This means comprises a second cam plate 51 (Figure 9) having a cam track recess 52 therein for each rod. The cam track recesses provided in the second cam plate are like those provided in the first cam plate, being similarly disposed and of the same relative extent as in the first cam plate. The ends of rods 21 are received in the cam track recesses 52, a bushing 53 being provided on each rod end.

Movement of the second cam plate relative to the first cam plate results in the ends of rods 21 in the cam track recesses being moved outwardly with respect to one another, correspondingly, the ends of the rods carrying the chuck jaws tend to move inwardly, the rods then acting as levers moved by opposite forces applied by the two cam plates, the ends of the levers carrying the jaws being fixed by the work piece in the jaws. The rods are retained in this position by the frictional engagement between the cam recesses and the rods ends fitting into such recesses and into the cam tracks in plate 31; such locking movement is further facilitated by providing the outside face or surface of the cam tracks 32 and the inside surface of the cam recesses 52 with a multiple of like serrations, as indicated at 54, so that the bushings on the rods fit into such serrations and do not move once they are jammed in such serration until the cam plates are moved relative to one another.

The cam plate 51 is provided with a cylindrical housing 56 having a recess 57 therein fitting over the end of housing 33, ball bearings 58 being provided between the two housings in a suitable rod.

To return the second cam plate 51 to starting position when the jaws are opened, means are provided for applying a rotational force. This means includes a coil spring 61 having a projection 62 fitting into a suitable recess 63 in the cam plate 51. The other end 64 of the spring fits into an aperture 64a in flange 66 provided upon a sleeve 67. The sleeve 67 and flange 66 fit into a cylindrical housing 56, ball bearings 68 being provided between the two in a suitable race to support the two rotatably with respect to one another.

To retain the sleeve 67 in position, a locking member 71 is provided having an internal screw thread 72 adapted to be received upon the threaded end 73 of hub 6 and so mount the sleeve 67 on the end of the hub 6. To retain the spring in a desired position of adjustment, a locking plate 74 is provided which, with screws 76 is effective to retain the spring in a desired tension, the tension of the spring 61 tending to tighten the threaded member 71 upon the threaded hub 73 so that once the member 71 and the flange 66 are engaged by the screws 76, the structure is secured together. The tension of the spring is adjusted by varying the relative position in which the threaded member and the flange is secured together.

In operation, with the chuck mounted upon a rapidly rotating spindle, it is only necessary to engage the cylindrical housing 33 to apply a restraining pressure thereto by means of the hand; the housing can slip in the hand, but the resistance to rotation is such that the jaws can be moved apart and a stationary object inserted. When the jaws are released, the spring pressure applied tightens the jaws and secures the article, but only in a loose fashion. If the housing 33 then released and housing 56 engaged by a hand, the relative movement of the housing 33 and its contained parts relative to housing 56 is sufficient to lock the jaws in that position of adjustment in which they are securely engaged with an object inserted between them; this is so even though the spindle is rotating rapidly for the interior of housing 33 and its contained parts is such that even a slight restriction applied to the housing will cause sufficient relative rotation between the two cam plates to lock the jaws. Subsequently, when it is desired to release the object, it is only necessary to again engage housing 33.

From the foregoing, I believe it will be apparent that I have provided a relatively novel and simple form of chuck which can be operated to release and engage objects securely even though the chuck is rotating. Because the rods 21 extend into the mid point of each jaw, the retaining fuse applied to each jaw is uniform over the face of the jaw. This insures a better retention of the work and less strain and wear on the working elements in the chuck.

I claim:

1. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a first cylindrical member carried by the first cam plate and extending rearwardly from the face plate, a first spring means between said face plate and said first cam plate and urging said face plate counter-clockwise with respect to said first cam plate, a second cam plate rotatable about said hub and having a cam track recess formed therein opposite to a cam track aperture in the first cam plate, each cam track recess being substantially similar to an opposite cam track aperture, the surface of each cam recess including a plurality of like arcuate serrations to engage and retain the end of a rod member, a second cylindrical member carried by the second cam plate and engaged cooperatively with the first cylindrical member to provide a housing for the chuck, a second spring means between said hub and said second cam plate and urging said second cam plate clockwise with respect to said face plate, said face plate having a slot therein in back of each jaw and opening into the cooperatively positioned cam track aperture, and a rod member having one end engaged with one of said jaws and extending through one of said cam track apertures and having its other end in one of said cam track recesses.

2. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a first cylindrical member carried by the first cam plate and extending rearwardly from the face plate, a first spring means between said face plate and said first cam plate and urging said face plate counter-clockwise with respect to said first cam plate, a second cam plate rotatable about said hub and having a cam track recess formed therein opposite to a cam track aperture in the first cam plate, each cam track recess being substantially similar to an opposite cam track aperture, a second cylindrical member carried by the second cam plate and engaged cooperatively with the first cylindrical member to provide a housing for the chuck, a second spring means between said hub and said second cam plate and urging said second cam plate clockwise, with respect to said face plate, said face plate having a slot therein in back of each jaw and operating into the cooperatively positioned cam track aperture, and a rod member having one end engaged with one of said jaws and extending through one of said cam track apertures and having its other end in one of said cam track recesses.

3. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a first cylindrical member carried by the first cam plate and extending rearwardly from the face plate, a second cam plate rotatable about said hub and having a cam track recess formed therein opposite to a cam track aperture in the first cam plate, each cam track recess being substantially similar to an opposite cam track aperture, a second cylindrical member carried by the second cam plate and engaged cooperatively with the first cylindrical member to provide a housing for the chuck, said face plate having a slot therein in back of each jaw and opening into the cooperatively positioned cam track aperture, and a rod member having one end engaged with one of said jaws and extending through one of said cam track apertures and having its other end in one of said cam track recesses.

4. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a second cam plate rotatable about said hub and having a cam track recess formed therein opposite to a cam track aperture in the first cam plate, each cam track recess being substantially similar to an opposite cam track aperture, said face plate having a slot therein in back of each jaw and opening into the cooperatively positioned cam track aperture, and a rod member having one end engaged with one of said jaws and extending through one of said cam track apertures and having its other end in one of said cam track recesses.

5. In a chuck, a plurality of jaws movable toward and away from one another to grasp or to release an object, a first means movable in a direction opposite to that in which the chuck is normally rotated in use to release the jaws and move them apart, a first spring means opposing the aforesaid movement and urging the jaws toward one another, a second means movable in a direction opposite to that in which the chuck is normally rotated in use to lock the jaws in that position which the jaws occupy upon initial movement of said second means, and a second spring means opposing the aforesaid movement of said second means.

6. In a chuck, a plurality of jaws movable toward and away from one another to grasp or to release an object, means for moving the jaws toward and away from one another, a first means movable in a direction opposite to that in which the chuck is normally rotated in use to move said moving means to release the jaws and move them apart, a first spring means opposing the aforesaid movement and urging the jaws toward one another, a second means movable in a direction opposite to that in which the chuck is normally rotated in use, to lock the moving means for jaws in that position which the jaws occupy upon initial movement of said second means, and a second spring means opposing the aforesaid movement of said second means.

7. In a chuck, a plurality of jaws movable toward and away from one another to grasp or to release an object, a rod normally extending parallel to the longitudinal axis of the chuck and engaged at one end with a jaw to move the jaw, a first means movable in a direction opposite to that in which the chuck is normally rotated in use to move each rod engaged with a jaw to release the jaws and move them apart, a first spring means opposing the aforesaid movement and urging the jaws toward one another, a second means movable in a direction opposite to that in which the chuck is normally rotated in use to move the other end of the rods with respect to one another to lock the jaws in that position which the jaws occupy upon initial movement of said second means, and a second spring means opposing the aforesaid movement of said second means.

8. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a second cam plate rotatable about said hub and having a cam track recess formed therein opposite to a cam track aperture in the first cam plate, each cam track recess being substantially similar to an opposite cam track aperture, said face plate having a slot therein in back of each jaw and opening into the cooperatively positioned cam track aperture, a rod member having one end engaged with one of said jaws and extending through one of said cam track apertures and having its other end in one of said cam track recesses, and means on said central hub supporting each rod slidably with respect to said hub for movement toward and away from said hub.

9. A chuck comprising a central hub having a face plate at one end thereof and having its other end adapted to be mounted on a rotatable shaft, a plurality of jaws mounted slidably in said face plate and adapted to be moved toward and away from one another to engage and release an object, a first cam plate rotatable about said hub and having a cam track aperture therein cooperatively positioned with respect to each jaw, a first cylindrical member carried by the first cam plate and extending rearwardly from the face plate, a first spring means between said face plate and said first cam plate and urging said face plate counterclockwise with respect to said first cam plate, a second cam plate rotatable about said hub and having a cam track recess formed therein opposite to a cam track aperture in the first cam plate, each cam track recess being substantially similar to an opposite cam track aperture, the surface of each cam recess including a plurality of like arcuate serrations to engage and retain the end of a rod member, a second cylindrical member carried by the second cam plate and engaged cooperatively with the first cylindrical member to provide a housing for the chuck, a second spring means between said hub and said second cam plate and urging said second cam plate clockwise with respect to said face plate, said face plate having a slot therein in back of each jaw and opening into the cooperatively positioned cam track aperture, a rod member having one end engaged with one of said jaws and extending through one of said cam track apertures and having its other end in one of said cam track recesses, and spaced flanged on said hub and supporting each rod member slidably.

EARL J. WELLS.

REFERENCES CITED

The following references are of record in the file of this patent:

UNITED STATES PATENTS

| Number | Name | Date |
|---|---|---|
| 1,367,632 | Smith | Feb. 8, 1921 |

FOREIGN PATENTS

| Number | Country | Date |
|---|---|---|
| 18,928 | Great Britain | of 1908 |
| 74,252 | Switzerland | Sept. 15, 1916 |